July 17, 1956
G. M. SCHIEDEL
2,755,435
COMMUTATOR CHECKER
Filed June 16, 1952
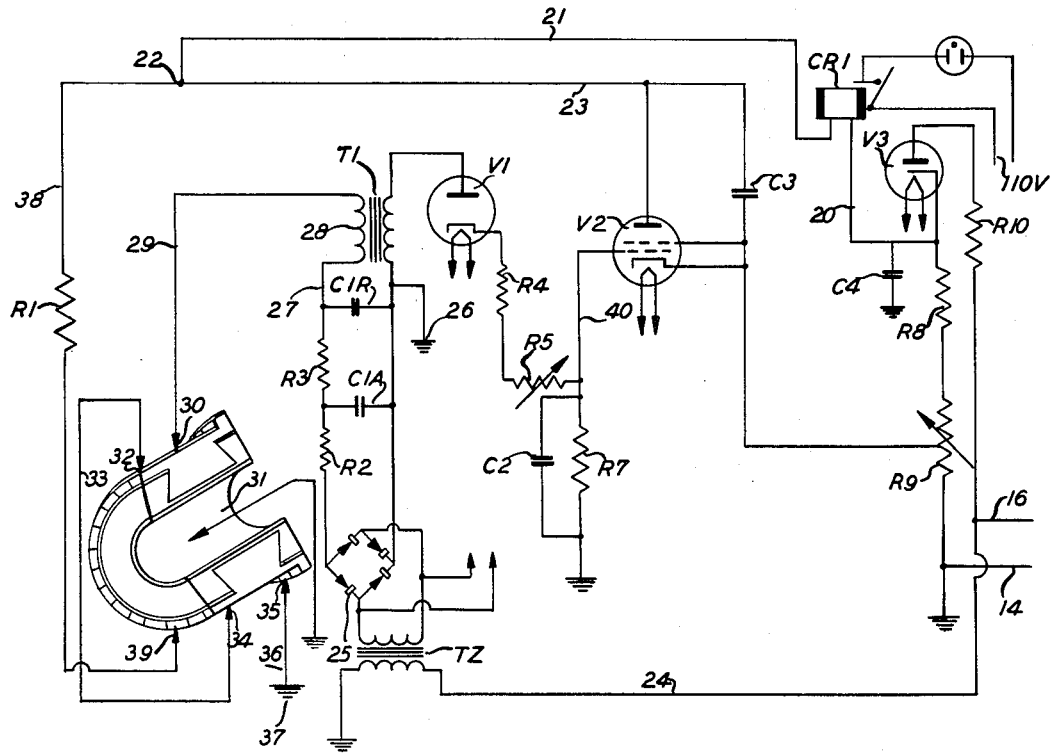
G.M. SCHIEDEL
INVENTOR.
BY E.C. McRae
J.R. Faulkner
J.H. Oster
ATTORNEYS

United States Patent Office 2,755,435
Patented July 17, 1956

2,755,435

COMMUTATOR CHECKER

George M. Schiedel, Ypsilanti, Mich., assignor to Ford Motor Company, Dearborn, Mich., a corporation of Delaware Application June 16, 1952, Serial No. 293,857

1 Claim. (Cl. 324—51)

This invention deals with the manufacture of direct current dynamoelectric machinery and more specifically with a process for checking assembled commutators either before or after they have been mounted upon an armature shaft. Direct current commutators are necessarily fabricated from a large number of individual copper segments which must be insulated electrically from each other and from ground despite the fact that they must be very compactly assembled. Each commutator is formed from a predetermined and invariable number of these copper segments. Any failure of the insulation or any variation from the exact required number of bars or segments will result in a completely inoperative electrical machine when an attempt is made to use this defective commutator. Due to inadequate checking methods defective commutators often escape detection until the machine in which they are assembled is completed.

The instant invention has been developed to provide a simple, accurate and inexpensive way of checking a commutator prior to their connection into their eventual electrical circuit. This check may be made either before or after the commutator is mounted upon the armature shaft. This invention can be best explained by reference to the figure of drawing which is a schematic circuit diagram of the commutator checker with a portion of a commutator being tested shown in perspective.

In the drawing energy is introduced ito leads 16 and 14 at the lower right-hand portion of the drawing. This energy is conventionally derived from a 120-volt 60 cycle commercial power line. It will be noted that as usual one side of this line, in this case conductor 14, is grounded. It will be noted that a lead runs from conductor 16 through resistance R10 to the plate of vacuum tube V3. Vacuum tube V3 may be any conventional diode rectifier, conveniently a 6X5 tube. The cathode of vacuum tube V3 is connected to the B plus side of the V2 tube circuit through conductor 20. Conductor 20 passes through the armature of relay CR1 for a purpose which will become obvious as the description proceeds. From the negative side of the armature of relay CR1 conductor 21 leads to junction 22. At junction 22 the B plus circuit divides into two branches, one of which comprises conductor 23 which leads to the plate of tube V2 which is a gaseous conduction thyratron, conveniently a 2050 tube. The plate and cathode of this tube are shunted by capacitor C3. The B plus circuit represented by conductor 20, is connected to ground through resistors R8 and R9 arranged in series and through capacitor C4. Resistance R9 may have a value of about 2500 ohms and is adjustable to provide the desired bias for the cathode of tube V2 (thryratron 2050). A source of commercial 60 cycle energy represented by conductor 16 is tapped by conductor 24 leading to transformer TZ which serves a dual function. The secondary of transformer TZ provides directly the energy required for heating the filaments of tubes V1, V2 and V3. The usual voltage employed for this purpose 6 3/10 volts. This 6 3/10 volt alternating current obtained from the secondary of transformer TZ is rectified through bridge rectifier 25 in conjunction with resistors R2 and R3 and capacitor C1A and C1R. One side of the direct current source so obtained is grounded as indicated at 26. The ungrounded conductor 27 leading from the rectifier circuit is passed through primary 28 of transformer T1 through conductor 29 to point 30 which is arranged to bear upon commutator 31. Spaced axially from point 30 and bearing upon the same commutator segment is point 32. It is to be understood that a plane determined by the axis of the commutator and point 30 will also include point 32. A conductor 33 leads from point 32 to point 34 which bears upon a commutator bar opposite or approximately opposite the commutator bar contacted by points 30 and 32. Points 32 and 34 are preferably in approximately the same radial plane. Spaced somewhat from point 34 is point 35 which bears upon the same commutator bar as point 34. Again, a plane determined by the axis of the commutator and point 34 will also include point 35. Point 35 may also well be made radially co-planar with point 30. Point 35 is grounded through conductor 36 at 37. Conductor 38 is connected to junction 22 through resistance R1 and terminates in point 39 which is arranged to bear upon the commutator adjacent point 34 and spaced peripherally therefrom, a distance represented by the width of one commutator bar.

The secondary of transformer T1 terminates at ground 26 on one side and at the plate of vacuum tube V1 on the other side. Vacuum tube V1 again may be any convenient rectifier tube and is conveniently an ordinary 6X5. The cathode of vacuum tube V1 is connected through fixed resistor R4 and variable resistor R5 to the control grid of thyratron tube V2. Intermediate adjustable resistance R5 and the control grid of tube V2, is conductor 40 which connects this variable resistor and control grid, and is grounded through resistor R7. Resistor R7 is shunted by capacitor C2.

In the operation of the above described apparatus a commutator to be tested is rotatably mounted by any convenient apparatus (not shown in the drawing) so that it can be rotated and remain in contact with points 30, 32, 34, 35 and 39. The commutator is then rotated through at least slightly more than one revolution with all of the above described circuits energized. In the event that a bar to bar short exists in the commutator the B plus side of the circuit will be grounded through relay CR1 through conductor 21, junction 22, conductor 38, resistance R1, point 39, point 35 and conductor 36. This will cause relay R1 to close and will energize a neon lamp or other warning or indicating device.

In the event the commutator to be checked contains an even number of bars, points 30 and 32 will be located diametrically opposite points 34 and 35. One complete revolution of a commutator containing X segments where X is an even number will produce on X interruptions of the flow of current from the ungrounded side of rectifier 25 through the primary 28 of transformer T1 through conductor 29, points 30, 32, 34 and 35 to ground. However, if during assembly one too few or one too many segments have been placed in the commutator, one revolution will produce approximately two X interruptions of this circuit by the co-action of points 30, 32, 34 and 35. Each interruption so caused is reflected by an E. M. F. which is impressed upon the plate of vacuum tube V1 by the secondary of transformer T1. Rectifier vacuum tube V1 will permit a portion of each of these surges of the proper polarity to flow from its plate to the cathode through resistance R4 and adjustable resistance R5 to charge capacitor C2. Inasmuch as the charge upon capacitor C2 is being continuously bled to ground through resistance R7 the potential to which capacitor C2 is charged is a direct function of the number of pulses obtained by the discharge of vacuum tube rectifier V1. The conduction or non-conduction of thyratron tube V2 is of course governed by the potential applied to its control grid from capacitor C2. It is apparent that thyratron tube V2 will conduct or fail to conduct, depending upon the rapidity with which impulses are received from vacuum tube V1. The constants of the circuits are so chosen that thyratron tube V2 will conduct when there is received from rectifier vacuum tube V1 approximately one and one-half X impulses for each revolution of the commutator. In this manner a change of only one commutator bar will produce a disporportionate large change in the number of impulses produced in the apparatus. In a typical operation a 28 bar generator commutator will engender 28 interruptions per revolution. If this commutator is inadvertently assembled as a 27 or 29 commutator which represents a variation of less than four per cent, the number of impulses produced will be approximately doubled. In such a case the circuits would be adjusted to cause tube V2 to fire or conduct at approximately 35 to 40 interruptions per revolution.

It is, of course, to be understood that in the event it is desired to check a commutator having an odd number of segments, that points 30 and 32 will be slightly shifted peripherally with respect to points 34 and 35 so that the same result is obtained. A cursory examination of this circuit will also show that a ground between any of the segments and the mounting will be detected.

When tube V2 fires and discharges to ground through resistor R9, sufficient current is drawn from rectifier vacuum tube V3 through conductor 20 and 21 to actuate relay 1 and give a warning indication.

I claim as my invention:

An apparatus for testing commutators comprising a source of electrical current, means for supporting and rotating the commutator in a fixed position and at a predetermined speed, a point contact electrically connected to the source of electrical current and supported to rest upon the commutator as it is rotated, a second point contact supported to rest upon the commutator at a location which is subsantially coplanar with the axis of the commutator and the first point contact and in engagement with the same commutator segment, a third point contact supported to rest upon the commutator at a point angularly removed from the first and second point contacts, an electrical conductor connecting said second and third point contacts, a fourth point contact supported to rest upon the commutator at a location which is substantially coplanar with the axis of the commutator and the said third point contact and in engagement with the same commutator segment, an indicating apparatus, and an electrical connection between the fourth point contact point and the indicating apparatus, said indicating apparatus being responsive to the frequency with which the current is interrupted during the rotation of the commutator at a predetermined speed.

No references cited.